(12) United States Patent
Ayyagari

(10) Patent No.: US 6,681,266 B2
(45) Date of Patent: Jan. 20, 2004

(54) LATE BINDING DYNAMIC SOFTWARE CONFIGURATION INFORMATION

(75) Inventor: Vamsi Ayyagari, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 129 days.

(21) Appl. No.: 09/060,123

(22) Filed: Apr. 14, 1998

(65) Prior Publication Data

US 2002/0062405 A1 May 23, 2002

(51) Int. Cl.[7] .................................................. G06F 9/00
(52) U.S. Cl. ....................................................... 709/331
(58) Field of Search ................................ 713/1–2, 100; 709/320, 331–332; 717/11

(56) References Cited

U.S. PATENT DOCUMENTS

| | | | |
|---|---|---|---|
| 4,649,479 A | | 3/1987 | Advani et al. ............... 364/300 |
| 4,974,151 A | | 11/1990 | Advani et al. ............... 364/200 |
| 5,247,683 A | | 9/1993 | Holmes et al. .............. 395/700 |
| 5,339,430 A | | 8/1994 | Lundin et al. ............... 395/700 |
| 5,365,606 A | * | 11/1994 | Brocker et al. .............. 709/305 |
| 5,421,009 A | * | 5/1995 | Platt ........................... 709/221 |
| 5,491,813 A | | 2/1996 | Bondy et al. ................ 395/500 |
| 5,555,416 A | * | 9/1996 | Owens et al. ................ 395/712 |
| 5,581,764 A | * | 12/1996 | Fitzgerald et al. ........... 395/703 |
| 5,655,148 A | | 8/1997 | Richman et al. ............. 395/828 |
| 5,659,751 A | * | 8/1997 | Heninger .................... 709/305 |
| 5,692,195 A | * | 11/1997 | Conner et al. ............... 709/305 |
| 5,748,963 A | * | 5/1998 | Orr ............................. 395/704 |
| 5,991,541 A | * | 11/1999 | Ozalp ......................... 395/710 |
| 6,112,025 A | * | 8/2000 | Mulchandani et al. ....... 709/331 |
| 6,247,128 B1 | * | 6/2001 | Fisher et al. ................. 713/1 |

* cited by examiner

Primary Examiner—John Follansbee
Assistant Examiner—V. H. Nguyen
(74) Attorney, Agent, or Firm—Hamilton & Terrile, LLP; Stephen A. Terrile (57) ABSTRACT

A method for customizing software configurations includes: providing a static pre-installation software package; identifying a late-bindable token of the static pre-installation package; assigning a unique late-bind identifier to the late-bindable token; assigning the late-bind identifier to a late-bind identifier default value; and assigning the late-bind identifier a corresponding token value. The token value is for binding to the token identified by the late-bind identifier when the customized software package is installed.

31 Claims, 7 Drawing Sheets

LATE BINDING DYNAMIC SOFTWARE CONFIGURATION INFORMATION

BACKGROUND

1. Field

The present invention relates to installing software on computer systems, and, more particularly, to generating customized software for execution on computer systems using late binding techniques.

2. Description of the Related Art

Computer systems are information handling systems which can be designed to give independent computing power to one user or a plurality of users. Computer systems may be found in many forms including, for example, mainframes, minicomputers, workstations, servers, personal computers, notepads and embedded systems. A typical computer system includes at least one processing unit, associated memory and a number of input/output (I/O) devices. A computer system processes information according to a program and produces resultant output information via the I/O devices. A program is a list of internally stored instructions such as a particular application program and/or an operating system. The programs that control the operation of a computer system are commonly referred to as software applications or simply software. Such software must be installed in memory of a computer system or systems in order to subsequently direct the operation of the computer system or systems.

In software, binding refers to associating two pieces of information with one another. The term is most often used with regard to binding a symbol or token such as the name of a variable with some descriptive information such as a memory address, a data type, or an actual value. In other words, binding is the assigning of a value or referent to an identifier. For example, binding includes the assignment of a value to a parameter and/or the assignment of an absolute address, virtual address, or device identifier to a symbolic address or label in a computer program.

The binding time is the time in a program's operation at which binding of information occurs. Binding time usually refers to the time at which program elements are bound to their storage locations and values. Binding of different types of elements often occurs at different times. Binding that occurs during program compilation or linkage is called static or early binding, whereas binding that occurs during program execution is called dynamic or late binding. In early binding, when a variable or sub-routine is called, the program does not have to take the time to calculate the address of the variable or sub-routine because it has already been inserted into the program code. That is, early binding is performed prior to the execution of a computer program and is not subject to change during program execution. Late binding often refers to applications that determine, during runtime, which software routines to call for particular data objects. Such applications are used, for example, when real time data is required for program execution. Thus, late binding is performed during the execution of a computer program.

Software pre-installation packages include condensed information for a software application install. Generic pre-installation packages are used in a factory environment to create any number of copies of a given software application or applications on the various computer systems produced. Typically, such pre-installation packages provide static or uniform copies of the software to the various computer systems produced. For instance, some configuration information will be the same for every computer on which the application to which the configuration information corresponds is installed. It is often difficult to change certain aspects of each installation in order to customize each installation for each computer system. For example, information such as software serial number and internet protocol addresses, etc., must be unique to every copy of the installation. Information such as CD-ROM drive letter may also be unique to every copy of the installation. Consequently, such unique information must be changed on each computer system. Such unique information is referred to herein as dynamic information.

One approach to customizing the software installation on a computer system is to partially install the applications in question. A partial installation requires later manual input from the computer system user to setup machine specific or otherwise unique information such as software serial number, Transport Control Protocol/Interface Program (TCP/IP) addresses, etc. Such an approach causes longer setup time for the computer system user and requires more computer system user knowledge and expertise. Additionally, more documentation for setup is also required. It is desirable that computer systems should be able to be used by persons not having a detailed understanding of all the configuration options of a computer and the knowledge of how to change them. Further, it is a constant aim in the field of data processing to produce systems that are easier to use.

SUMMARY

It has been discovered that dynamic information may be late-bound in pre-installation packages. A method of late binding dynamic information provides the advantage that customized or unique information which is not known at the time of software package development but which is known at the time of computer system manufacture may be bound in a pre-installation package prior to loading the pre-installation package to computer systems ordered by a customer. Such a method provides the further advantage that such information need not be known by the customer or user of the computer system. The required knowledge and expertise of the customer or user is thereby minimized and the computer systems are made easier to use.

A method for late binding dynamic software information includes: providing a static pre-installation software package; initializing the static pre-installation software package for subsequent late binding to provide an initialized pre-installation software package; updating the initialized pre-installation software package to include dynamic information to provide a dynamic pre-installation software package; and loading the dynamic pre-installation software package to a storage medium for subsequent installation of the dynamic pre-installation software package.

A method for customizing software configurations includes: providing a static pre-installation software package; identifying a late-bindable token of the static pre-installation package; assigning a unique late-bind identifier to the late-bindable token; assigning the late-bind identifier to a late-bind identifier default value; and assigning the late-bind identifier a corresponding token value. The token value is for binding to the token identified by the late-bind identifier when the customized software package is installed.

A method for late binding customized information in a software pre-installation package, the method includes: providing a generic pre-installation software package including tokens having assigned default values; initializing the generic pre-installation software package for receiving values at late bind time by assigning a late bind identifier to each token to provide an initialized pre-installation software package; providing a list of custom token values; and adding the custom token values to the initialized software package to provide a custom pre-installation software package in which the custom token values are prepared for subsequent late binding to corresponding tokens at late bind time to provide a custom installed software package.

A method for customizing software configurations includes: finding a late-bindable token in a configuration file of pre-installation software; assigning a unique late-bind identifier to the late-bindable token; generating an initialization file; providing a token value; assigning the token value to the late-bind identifier in the initialization file; and late binding the token value to the token specified by the late-bind identifier during installation of the pre-installation software. The initialization file includes the late-bind identifier and a corresponding late-bind identifier potential value.

A computer system includes a processor and a memory. The memory is coupled to the processor. The memory includes software installed thereon. The software is installed by a software installation procedure. The software installation procedure includes: providing a static pre-installation software package; initializing the static pre-installation software package for subsequent late binding to provide an initialized pre-installation software package; updating the initialized pre-installation software package to include dynamic information to provide a dynamic pre-installation software package; and loading the dynamic pre-installation software package to a storage medium for subsequent installation of the dynamic pre-installation software package.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following description is intended to be illustrative of the invention and should not be taken to be limiting. Rather, any number of variations may fall within the scope of the invention which is defined in the claims following the description.

Figure 1:
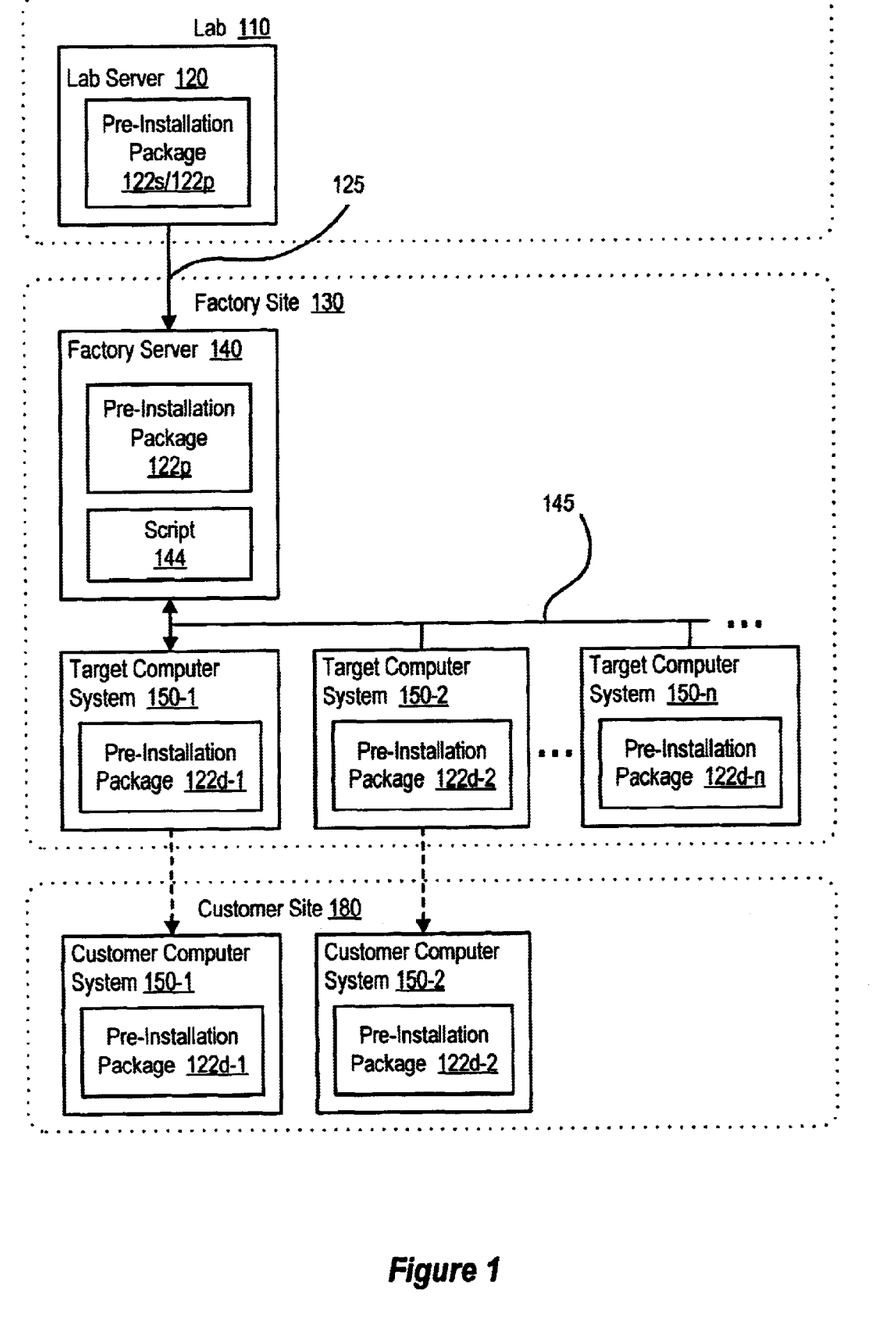
FIG. 1 shows exemplary computer system environments including computer systems and networks thereof.

FIG. 1 shows the various environments in which software is developed, installed and used. For example, software packages are developed in lab 110, loaded onto computer systems in factory site 130, and used by customers at customer site 180. Lab 110 includes lab server 120 which in turn includes pre-installation package 122s/122p. Lab 110 may also include various development and/or test computer systems (not shown) coupled to lab server 120. Factory site 130 includes factory server 140 and target computer systems 150-1, 150-2 through 150-n, generally referred to as target computer systems 150. Factory server 140 includes pre-installation package 122p and script file 144. Factory server 140 is coupled to lab server 120 via network connection 125. Factory server 140 is coupled to target computer systems 150 via network connection 145. Target computer systems 150-1, 150-2 through 150-n include respective pre-installation packages 122d-1, 122d-2 through 122d-n, generically referred to as pre-installation packages 122d. Customer site 180 includes customer computer systems 150-1, 150-2 which in turn include pre-installation packages 122d-1, 122d-2, respectively.

Pre-installation package 122s is software which is developed in lab 110 on lab server 120. Pre-installation package 122s includes various software applications and configuration information that is generic to many target computer systems. For example, a configuration file of pre-installation package 122s includes registry information that differentiates a pure computer system (a computer system with an operating system only) from that of an installed computer system (a computer system with an operating systems and various application software). Because pre-installation package 122s includes information generic to multiple target computer systems, pre-installation package 122s is a static pre-installation package.

Generally, after pre-installation package 122s has been developed and tested, pre-installation package 122s is initialized for subsequent late-binding (described below) to provide pre-bound pre-installation package 122p. Pre-installation package 122p includes the above described configuration file and an initialization file. Pre-installation package 122p is loaded from lab server 120 to factory server 140 via network connection 125. Factory server 140 adds dynamic information from script file 144 to pre-installation package 122p to provide dynamic pre-installation packages 122d-1, 122d-2 through 122d-n which are loaded to target computer systems 150-1, 150-2 through 150-n, respectively, via network connection 145. Target computer systems 150-1, 150-2 are then shipped from factory site 130 to a customer site 180 to become customer computer systems 150-1, 150-2, respectively.

Figure 2:
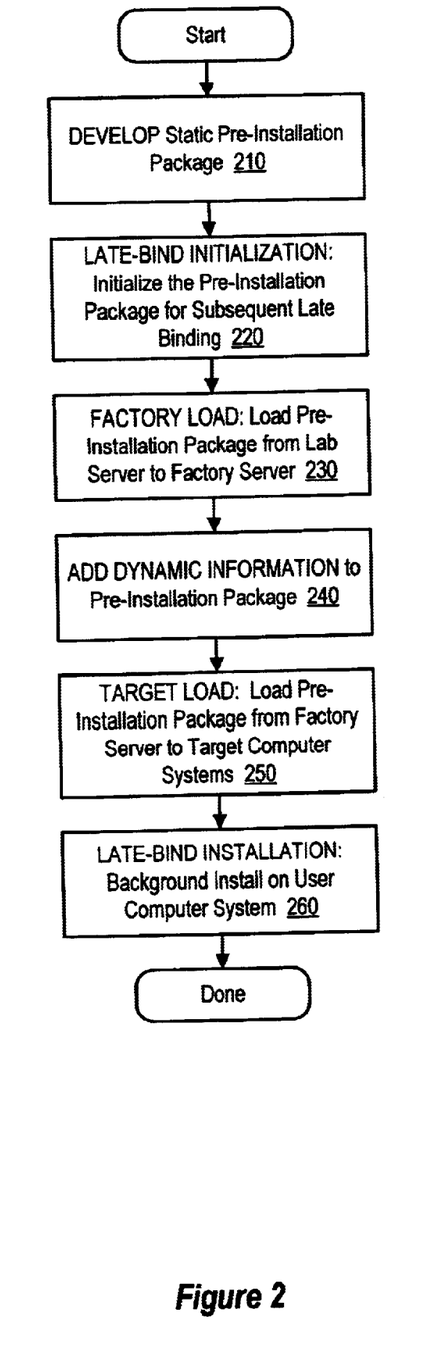
FIG. 2 shows a flow chart of an embodiment of a method for generating customized software for execution on computer systems using late binding techniques.

FIG. 2 shows a high-level flow chart of one method of late binding dynamic information in software installation preparation and execution. Generally, a pre-installation software package is provided and then searched for late-bindable tokens (typically in lab 110). Late-bindable tokens are tokens for information that is typically customized or unique to each computer system produced. Such information is often not known during the development or purchase of the pre-installation package. Rather, such information is known at the time of computer system manufacture and may be added to the pre-installation package prior to loading the pre-installation package to computer systems ordered by a customer. The customized information is added to the pre-installation package in factory 130. Such customized information is bound to corresponding token(s) at late bind time (e.g., during execution of the installation program).

Specifically, during develop operation 210, the static pre-installation package 122s is developed in lab 110 and stored in a database on lab server 120. Develop operation 210 is described below with reference to FIG. 6. After develop operation 210 and during late-bind initialization operation 220, pre-installation package 122s is initialized for subsequent late binding to provide pre-bound pre-installation package 122p. Late-bind initialization operation 220 is described below with reference to FIG. 3. The pre-bound pre-installation package 122p is stored in a database on lab server 120.

After late-bind initialization operation 220 and during factory load operation 230, pre-installation package 122p is loaded from lab server 120 to factory server 140. After factory load operation 230 and during add dynamic information operation 240, factory server 140 adds dynamic information from script file 144 to pre-installation package 122p to provide dynamic pre-installation packages 122d. The dynamic information is generated from an order that is placed by a customer for a target computer system 150. Add dynamic information operation 240 is further described below with reference to FIG. 4. After add dynamic information operation 240 and during target load operation 250, each of pre-installation packages 122d is loaded to a respective one of target computer systems 150.

After target load operation 250, target computer systems 150-1, 150-2 are shipped from factory 130 to customer site 180 to become customer computer systems 150-1, 150-2. During late-bind installation operation 260, the pre-installation packages 122d-1, 122d-2 are late-bound and installed on customer computer systems 150-1, 150-2, respectively. Late-bind installation operation 260 is described below with reference to FIG. 5.

Figure 6:
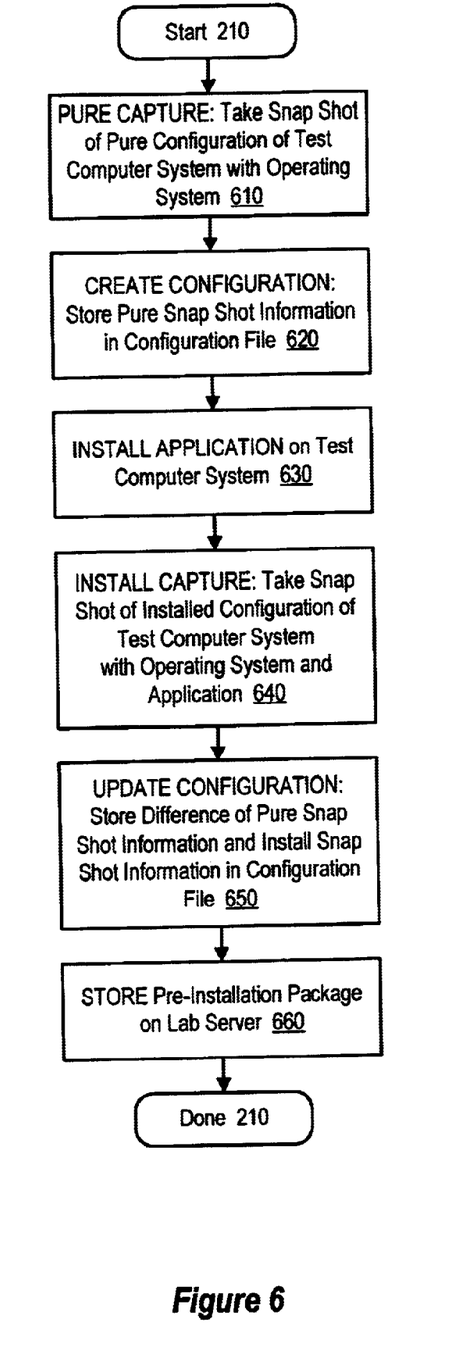
FIG. 6 shows a flow chart of an embodiment of software package development.

FIG. 6 shows a flow chart of develop operation 210. During pure capture operation 610, a snap shot of a pure test computer system with only an operating system is taken to generate pure configuration information. After pure capture operation 610 and during create configuration operation 620, the pure configuration information obtained from the snap shot of pure capture operation 610 is stored in a configuration file, typically on the test computer system. After create configuration operation 620 and during install application operation 630, an application or applications are installed on the test computer system. After install application operation 630 and during install capture operation 640, a snap shot of the test computer system with the operating system and installed application(s) is taken to generate install configuration information. After install capture operation 640 and during update configuration operation 650, the difference between the install configuration information and the pure configuration information is stored in the configuration file. After update configuration operation 650 and during store operation 660, a pre-installation package 122s including the configuration file is stored on lab server 120.

Figure 3:
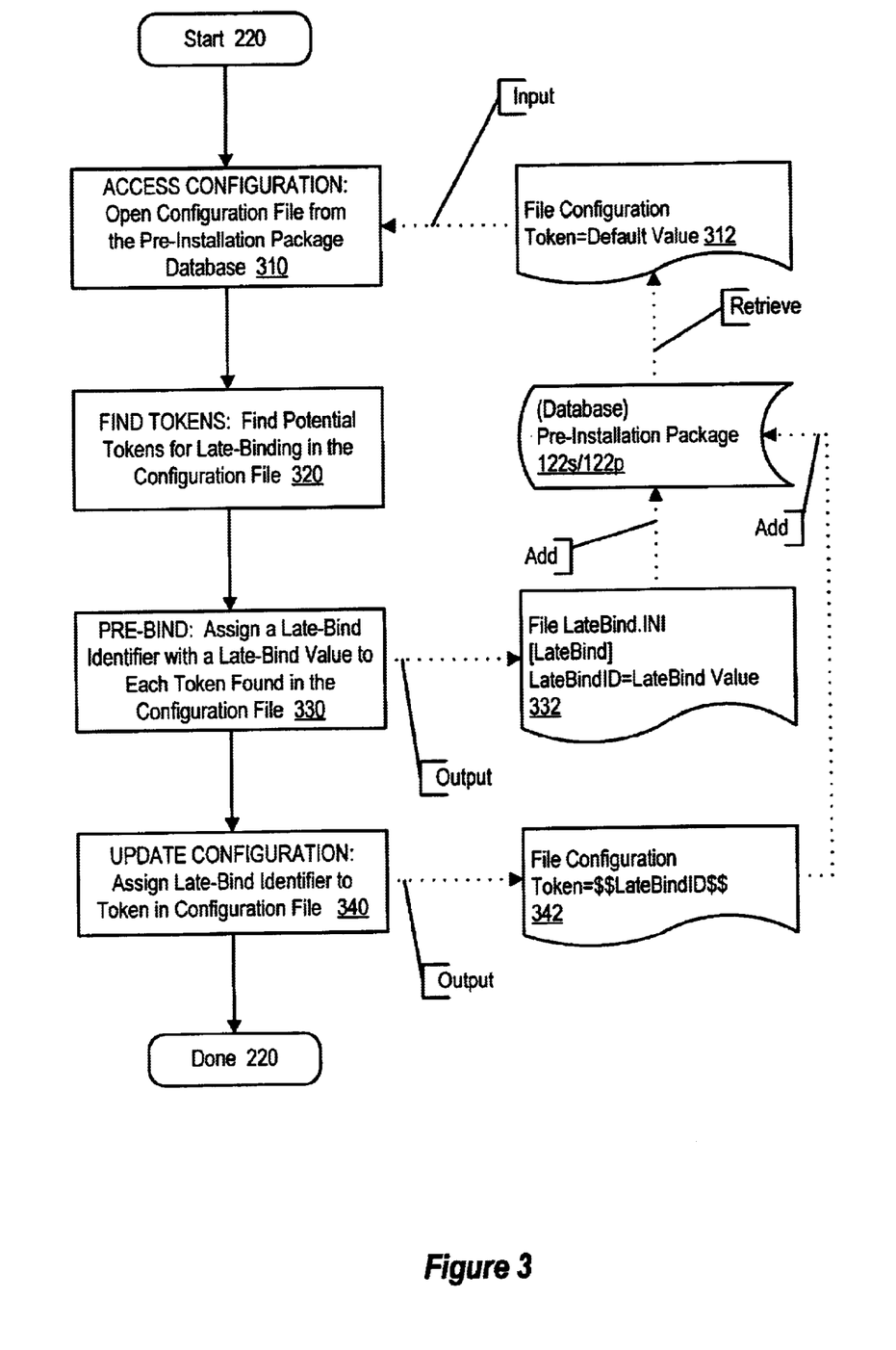
FIG. 3 shows a flow chart of an embodiment of late-bind initialization.

FIG. 3 shows a flow chart of the late-bind initialization operation 220 of FIG. 2. During access configuration operation 310, configuration file 312 is retrieved from pre-installation package 122s. Configuration file 312 may be any data structure which stores configuration information. For example, configuration file 312 may be a standard text file containing lines of information. Each line of information determines a configuration parameter. Configuration file 312 may also be a binary file which is editable by a tool, proprietary or otherwise. In such a case, although not directly readable from configuration file 312, the configuration parameters determined by configuration file 312 may still be conceptualized as having lines of configuration information.

After access configuration operation 310 and during find tokens operation 320, tokens which are candidates for late binding are located in configuration file 312. For example, TCP/IP addresses are one example of dynamic information which must be unique to each computer system. Because the actual TCP/IP addresses for computer systems ordered by a customer are typically not known at the time of develop operation 210, but are known at add dynamic information operation 240, TCP/IP addresses are candidates for late binding. Therefore, the TCP/IP address assignment in configuration file 312 is located during find tokens operation 320. Although the examples discussed herein relate to TCP/IP addresses, other tokens may be late bound in accordance with the invention. For example, software serial number and CD-ROM drive letters are prime candidates for late binding in accordance with the invention. Other tokens may also be late bound depending on the software applications, computer systems, customer requirements and other circumstances.

After find tokens operation 320 and during pre-bind operation 330, the tokens found in configuration file 312 during find tokens operation 320 are initialized for late-binding. Specifically, a late-bind identifier is created for each token. An initialization file 332 is generated which contains each late-bind identifier. In initialization file 332, each late-bind identifier is assigned the default late-bind value originally assigned to each token in configuration file 312. For example, a line in initialization file 332 reads as follows:

TCPIP=123.123.123.123

In the above example, "TCPIP" is the late-bind identifier, and "123.123.123.123" is the initially assigned default late-bind value from configuration file 312. Initialization file 332 is added to pre-installation package 122s after all of the late-bind identifiers corresponding to the tokens selected for late binding are assigned a late-bind value.

After pre-bind operation 330 and during update configuration operation 340, each default late-bind value originally assigned to each token in configuration file 312 of pre-installation package 122s is replaced with the corresponding late-bind identifier. For example, a line in configuration file 312 is changed from

TCP/IP=123.123.123.123 to

TCP/IP $$TCPIP$$.

In the above example, "TCP/IP" is the token, "123.123.123.123" is the initially assigned default late-bind value, and "$$TCPIP$$" is the late-bind identifier. Configuration file 312 is then added to pre-installation package 122s to provide pre-bound pre-installation package 122p.

Figure 4:
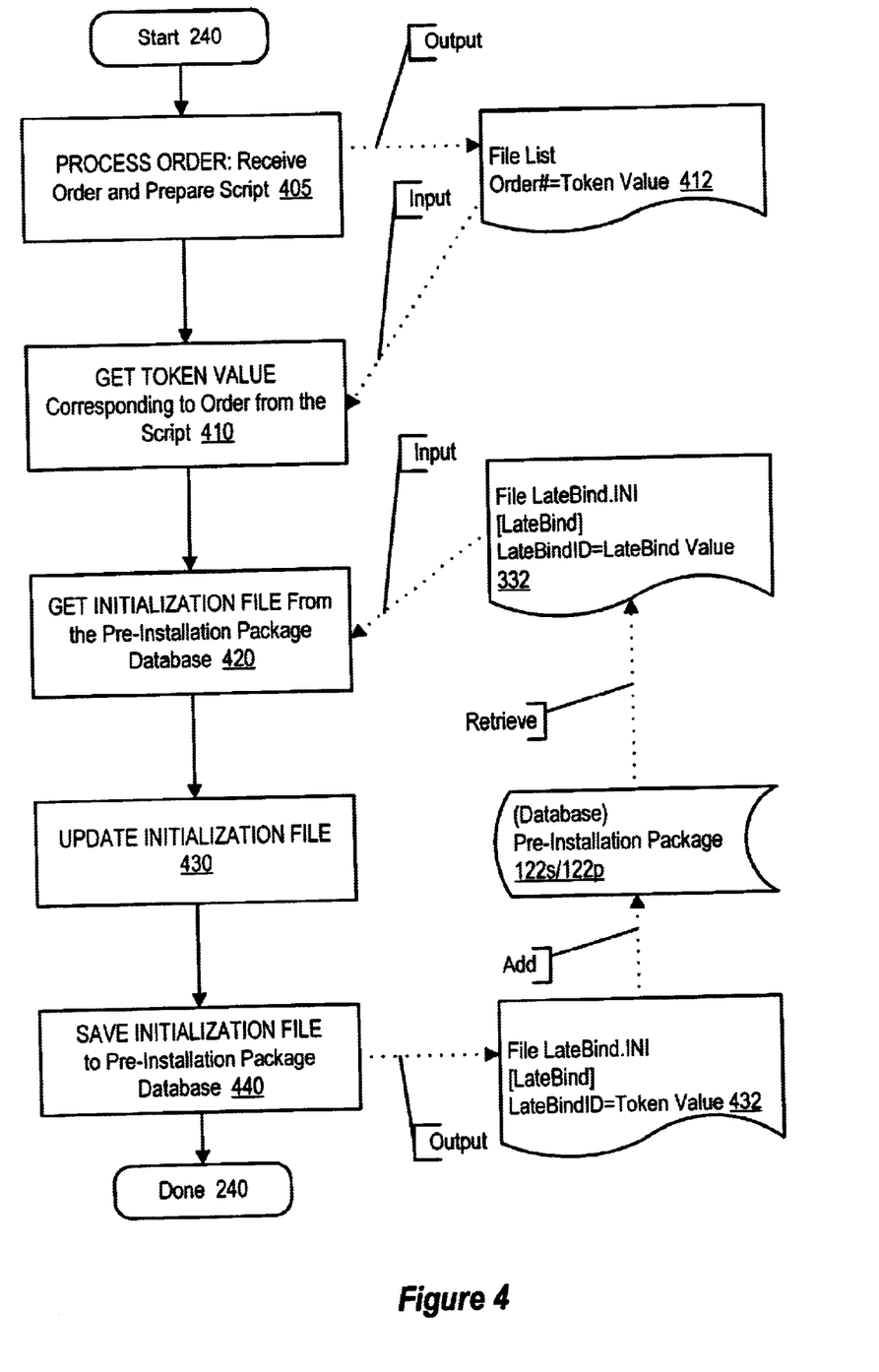
FIG. 4 shows a flow chart of an embodiment of late binding dynamic and static software information.

FIG. 4 shows a flow chart of the add dynamic information operation 240 of FIG. 2. During process order operation 405, an order is received for a target computer system 150 having a specific configuration as provided by pre-installation package 122d. Although orders are shown to be received at the beginning of add dynamic information operation 240, orders may be received and processed at any time before update initialization file operation 430. Information that is potentially unique (i.e., dynamic information) to each received order is placed in script file 412. Script file 412 includes a list of order numbers and a corresponding token or plurality of tokens.

After process order operation and during get token value operation 410, script file 412 is accessed to retrieve the dynamic information which is to be added to pre-installation package 122p to provide the various pre-installation packages 122d. Script file includes a list of dynamic information. For example, each target computer system 150 ordered by a customer is assigned a unique order number. The pre-installation package 122d which will be loaded onto the target computer system 150 must include the unique information ordered by the customer. Script file 412 includes a list of token values which are the unique information to be provided to each target computer system 150. For example, each target computer system 150 ordered by the customer must include a different TCP/IP address. Script file 412 includes a TCP/IP token value which is the actual TCP/IP address to be downloaded to a particular target computer system 150-1 having the current, unique order number.

After get token value operation 410 and during get initialization file operation 420, initialization file 332 is retrieved from the pre-installation package 122p. As discussed above with reference to FIG. 3, initialization file 332 includes a line assigning a late-bind value to a late-bind identifier corresponding to a token for a particular target computer system 150.

After get initialization file operation 420 and during update initialization file operation 430, each late-bind identifier is assigned a token value. For example, initialization file 332 included the following line:

TCPIP=123.123.123.123

During update initialization file operation 430, the above line is modified so that the late-bind identifier "TCPIP" is assigned an actual, ordered token value instead of the default late-bind value "123.123.123.123:"

TCPIP=111.111.111.111

In the above example, "TCPIP" is the late-bind identifier, and "111.111.111.111" is an exemplary dynamic or unique token value to be assigned to a target computer system 150 ordered by the customer. The reassignment from the default late-bind value(s) to the actual token value(s) provides initialization file 432.

After update initialization file operation 430 and during save initialization file operation 440, initialization file 432 is added to pre-installation package 122p to provide a particular pre-installation package 122d. For example, if the above token value TCP/IP address was ordered by a customer for target computer system 150-1, then pre-installation package 122d-1 is generated.

Figure 5:
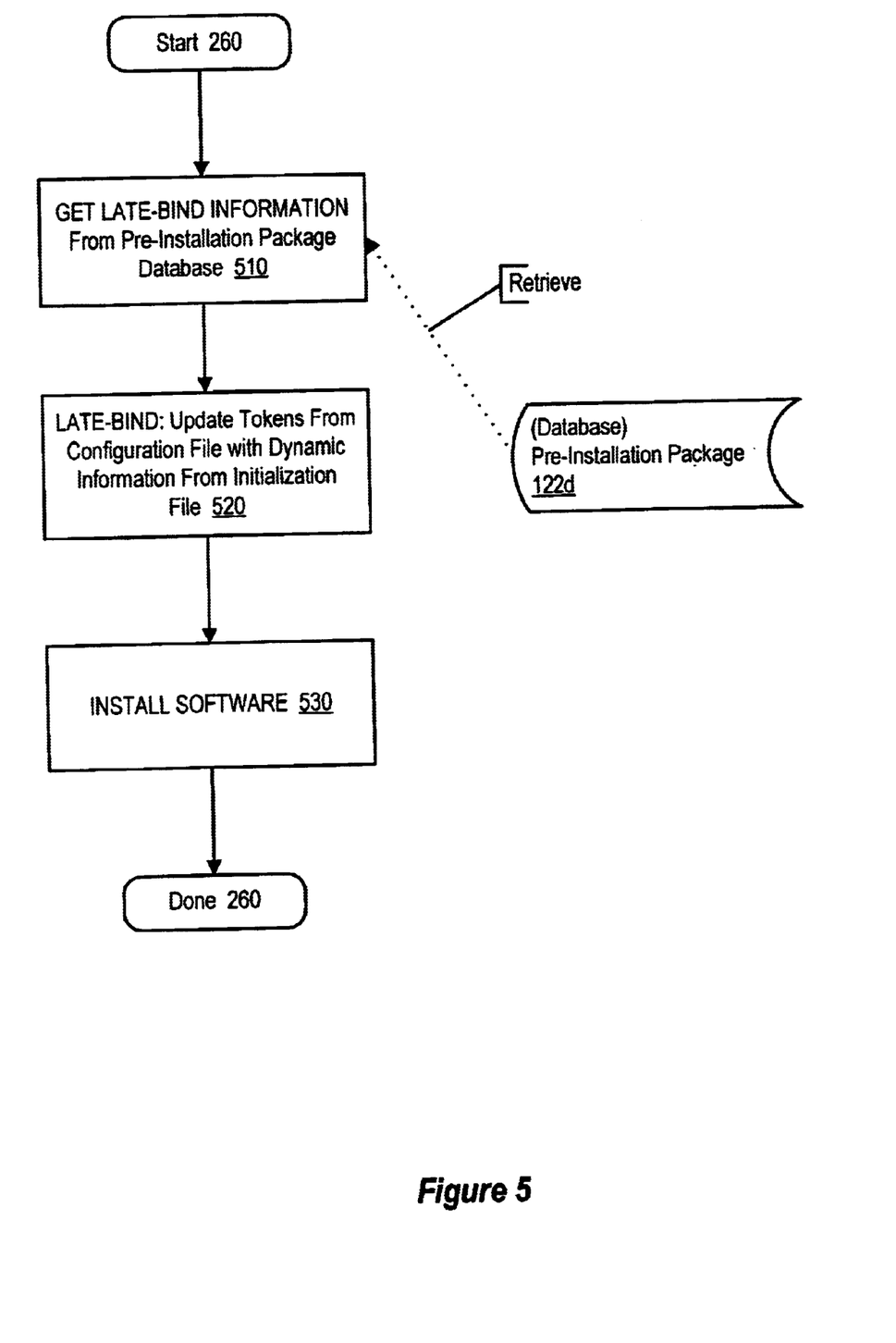
FIG. 5 shows a flow chart of an embodiment of installing late-bound software.

FIG. 5 shows a flow chart of the late-bind installation operation 260 of FIG. 2. During get late-bind information operation 510, initialization file 432 and configuration file 342 are retrieved from pre-installation package 122d. The dynamic information in initialization file 432 is used to update configuration file 342 prior to installation. For example, when customer computer system 150-1 is at customer site 180, configuration file 342 and the initialization file including the dynamic information ordered by the customer is retrieved from pre-installation package 122d-1. After get late-bind information operation 510 and during late-bind operation 520, each token from configuration file 342 is bound to the dynamic information from initialization file 432. Continuing the above example, prior to late-bind operation 520, configuration file 342 includes the following line:

TCP/IP=$$TCPIP$$;

and initialization file 432 includes the following line:

TCPIP=111.111.111.111

During late-bind operation 520, the two lines above are combined to read as follows:

TCP/IP=111.111.111.111

Thus, in the memory of the customer computer system 150, the actual token value from initialization file 432 is combined with the corresponding token from configuration file 342 during late-bind operation 520.

After late-bind operation 520, the software of pre-installation package 122d-1 is installed on customer computer system 150-1 using any appropriate, well known method.

Figure 7:
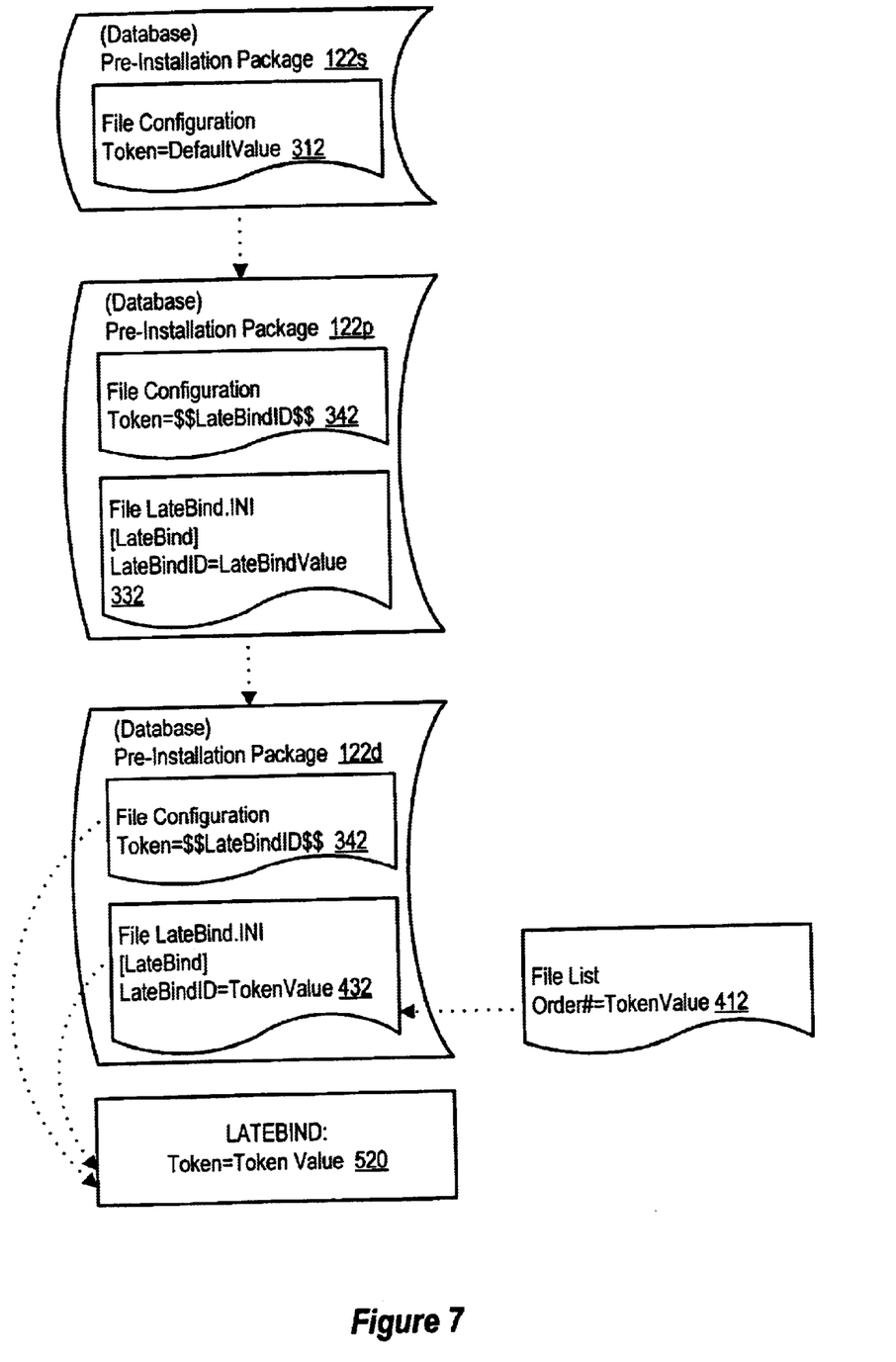
FIG. 7 shows exemplary pre-installation software packages at various stages of development, installation and use.

The above exemplary description may be further understood with reference to FIG. 7. During develop operation 210 of FIG. 2, pre-installation package 122s is provided and/or developed in lab 110 of FIG. 1. As shown in FIG. 7, pre-installation package 122s includes configuration file 312 which assigns a default value to each late-bindable token. As such, pre-installation package 122s includes static information. During late-bind initialization operation 220 of FIG. 2, pre-installation package 122p is developed in lab 110 of FIG. 1. As shown in FIGS. 3 and 7, pre-installation package 122p includes configuration file 342 and initialization file 332. Configuration file assigns a late-bind identifier to the each-bindable token, and initialization file assigns a late-bind value to each late-bind identifier. During add dynamic information operation 240 of FIG. 2, pre-installation package 122d is developed by adding dynamic information from file list 412. Specifically, as shown in FIGS. 4 and 7, initialization file is edited to assign a token value to each late-bind identifier for which dynamic information is required (e.g. ordered by a customer). During late-bind installation operation 260 of FIG. 2, and as shown in FIG. 7, each token value assigned to a corresponding late-bind identifier is late bound to a token which was assigned the corresponding late-bind identifier (e.g., during late-bind operation 520 of FIG. 5).

The above description is intended to describe at least one example of the invention. Consequently, the above description is not intended to define the scope of the invention. Rather, the scope of the invention is defined in the claims below. Thus, other examples of the invention may include various modifications, additions, and/or improvements to the above description. For example, the operations given in the above description are for illustration only. Operations may be combined or the functionality of the operations may be distributed in additional operations in accordance with the invention. Although an attempt has been made to outline a few exemplary variations, other examples of the invention are within the scope of invention as defined in the claims below.

What is claimed is:

1. A method for late binding dynamic software information comprising:
    initializing a static pre-installation software package for subsequent late binding to provide an initialized pre-installation software package;
    updating the initialized pre-installation software package to include dynamic information to provide a dynamic pre-installation software package, wherein the dynamic pre-installation software package is configured to perform late binding of the dynamic information when the dynamic pre-installation software package is installed.

2. A method as recited in claim 1 further comprising:
    loading the initialized pre-installation software package to a factory storage medium for subsequent loading to a target computer system; and subsequently loading the dynamic pre-installation software package to a storage medium for the late binding during subsequent installation of the dynamic pre-installation software package.

3. A method as recited in claim 2 wherein the loading the initialized pre-installation software package is performed before updating the initialized pre-installation software package.

4. A method as recited in claim 1 further comprising:
receiving an order for a target computer system before loading the dynamic pre-installation software package; and
preparing a file including the dynamic information, the dynamic information being determined by the order.

5. A method as recited in claim 4 wherein the order is received before updating the initialized pre-installation software package.

6. A method as recited in claim 1 wherein the initializing the static pre-installation software package for subsequent late binding to provide the initialized pre-installation software package comprises:
accessing configuration information in the static pre-installation software package;
identifying a token in the configuration information of the static pre-installation software package; and
assigning a late-bind identifier to the identified token in the configuration information of the static pre-installation software package.

7. A method as recited in claim 6 wherein the updating the initialized pre-installation software package to include the dynamic information to provide the dynamic pre-installation software package comprises:
accessing the dynamic information;
accessing the configuration information of the static pre-installation software package; and
assigning the dynamic information to the identified token in the configuration information of the static pre-installation software package to provide the dynamic pre-installation software package.

8. A method as recited in claim 7 further comprising:
installing the dynamic pre-installation software package on a target computer system.

9. A method as recited in claim 8 wherein the installing the dynamic pre-installation software package on the target computer system comprises late binding the dynamic information to the token.

10. A method as recited in claim 1 further comprising:
installing the dynamic pre-installation software package on a target computer system.

11. A method as recited in claim 2 wherein the storage medium to which the dynamic pre-installation software package is loaded is comprised within a computer system.

12. A method for customizing software configurations comprising:
providing a static pre-installation software package;
identifying a late-bindable token of the static pre-installation package;
assigning a unique late-bind identifier to the late-bindable token to provide a customized software package;
assigning the late-bind identifier to a late-bind identifier default value; and
assigning the late-bind identifier a corresponding token value, the token value for binding to the token identified by the late-bind identifier when the customized software package is installed.

13. A method as recited in claim 12 wherein
the late-bindable token is assigned a default value in a configuration file of the static pre-installation package; and
the assigning a late-bind identifier to the late-bindable token includes replacing the default value with the unique late-bind identifier.

14. A method as recited in claim 13 wherein
the assigning the late-bind identifier to the late-bind identifier default value includes generating an initialization file containing the late-bind identifier and the late-bind identifier default value.

15. A method as recited in claim 14 wherein the assigning the late-bind identifier a corresponding token value comprises:
providing a script file including the token value;
accessing the token value in the script file; and
assigning the token value to the late-bind identifier in the initialization file.

16. A method as recited in claim 15 further comprising:
loading the static pre-installation package including the configuration file and the initialization file to a target computer system after assigning the token value to the late-bind identifier in the initialization file.

17. A method as recited in claim 12, the method further comprising:
installing the static pre-installation package on a computer system after assigning the late-bind identifier the corresponding token value.

18. A method as recited in claim 17 wherein the installing the pre-installation package comprises:
late binding the token value to the late-bindable token specified by the late-bind identifier when the static pre-installation software package is installed.

19. A method as recited in claim 18 wherein the late binding the token value comprises:
identifying the late-bindable token in the configuration file;
identifying the late-bind identifier assigned to the late-bindable token in the configuration file;
identifying the late-bind identifier in the initialization file;
identifying the token value assigned to the late-bind identifier in the initialization file; and
late-binding the token value to the late-bindable token when the static pre-installation software package is installed.

20. A method for customizing software configurations comprising:
finding a late-bindable token in a configuration file of pre-installation software;
assigning a unique late-bind identifier to the late-bindable token;
generating an initialization file including the late-bind identifier; and
a corresponding late-bind identifier potential value;
providing a token value;
assigning the token value to the late-bind identifier in the initialization file; and
late binding the token value to the token specified by the late-bind identifier during installation of the pre-installation software.

21. A computer system comprising:
a processor; and a memory coupled to the processor, the memory including software installed thereon, the software being installed by a software installation procedure including initializing a static pre-installation software package for subsequent late binding to provide an initialized pre-installation software package;

updating the initialized pre-installation software package to include dynamic information to provide a dynamic pre-installation software package, wherein the dynamic pre-installation software package is configured to perform late binding of the dynamic information when the dynamic pre-installation software package is installed.

22. A computer system as recited in claim 21 wherein the software installation procedure further comprises:

loading the initialized pre-installation software package to a factory storage medium for subsequent loading to a target computer system before loading the dynamic pre-installation software package; and subsequently loading the dynamic pre-installation software package to a storage medium for the late binding during subsequent installation of the dynamic pre-installation software package.

23. A computer system as recited in claim 22 wherein the loading the initialized pre-installation software package is performed before updating the initialized pre-installation software package.

24. A computer system as recited in claim 21 wherein the software installation procedure further comprises:

receiving an order for a target computer system before loading the dynamic pre-installation software package; and preparing a file including the dynamic information, the dynamic information being determined by the order.

25. A computer system as recited in claim 24 wherein the order is received before updating the initialized pre-installation software package.

26. A computer system as recited in claim 21 wherein the initializing the static pre-installation software package for subsequent late binding to provide the initialized pre-installation software package comprises:

accessing configuration information in the static pre-installation software package;

identifying a token in the configuration information of the static pre-installation software package; and assigning a late-bind identifier to the identified token in the configuration information of the static pre-installation software package.

27. A computer system as recited in claim 26 wherein the updating the initialized pre-installation software package to include the dynamic information to provide the dynamic pre-installation software package comprises:

accessing the dynamic information;

accessing the configuration information of the static pre-installation software package; and assigning the dynamic information to the identified token in the configuration information of the static pre-installation software package to provide the dynamic pre-installation software package.

28. A computer system as recited in claim 27 wherein the software installation procedure further comprises:

installing the dynamic pre-installation software package on a target computer system.

29. A computer system as recited in claim 28 wherein the installing the dynamic pre-installation software package on the target computer system comprises:

late binding the dynamic information to the token.

30. A computer system as recited in claim 21 wherein the software installation procedure further comprises:

installing the dynamic pre-installation software package on a target computer system.

31. A computer system as recited in claim 21 wherein the storage medium to which the dynamic pre-installation software package is loaded is comprised within the computer system.

* * * * *